Dec. 17, 1968   B. A. COLE   3,417,193
ELECTRICAL MODULE HAVING TERMINALS MADE FROM SEMICIRCULAR
WIRE AND METHOD OF MAKING THE SAME
Filed Feb. 17, 1966   2 Sheets-Sheet 1
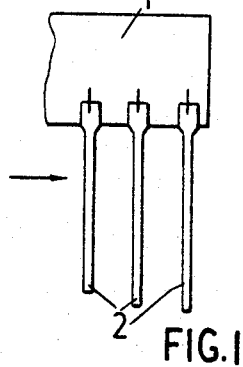
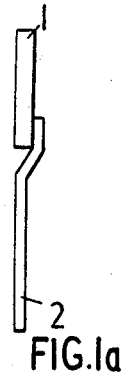
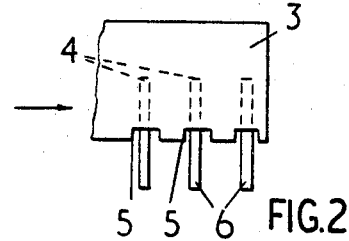
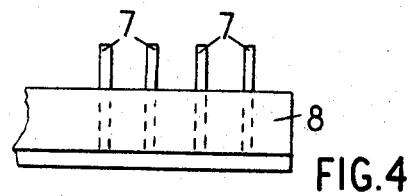
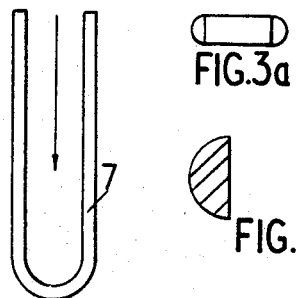
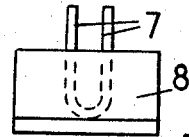
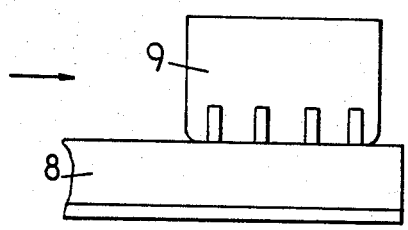
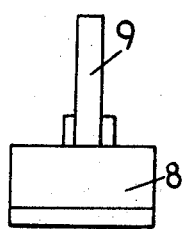
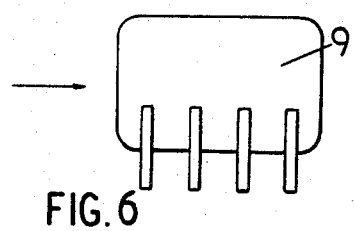
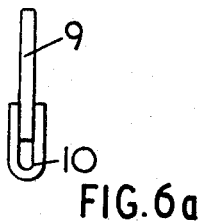
INVENTOR
BERNARD AUTHUR COLE
ATTORNEYS Dec. 17, 1968  B. A. COLE  3,417,193
ELECTRICAL MODULE HAVING TERMINALS MADE FROM SEMICIRCULAR
WIRE AND METHOD OF MAKING THE SAME
Filed Feb. 17, 1966  2 Sheets-Sheet 2
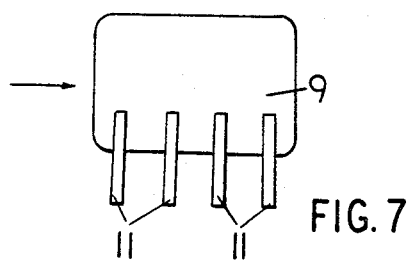
FIG. 7
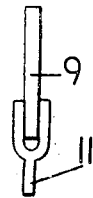
FIG. 7a
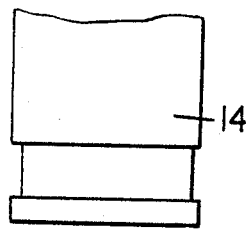
FIG. 8
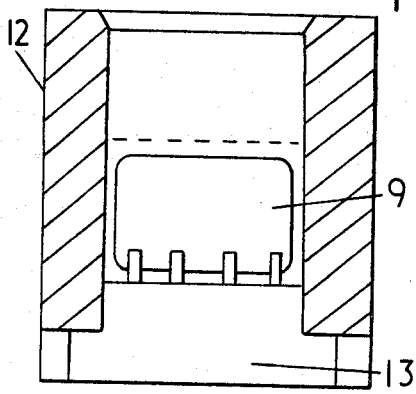
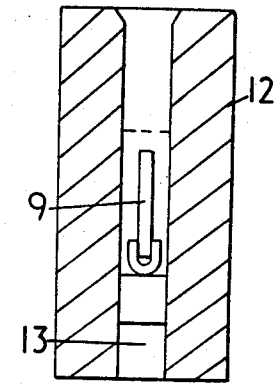
FIG. 8a
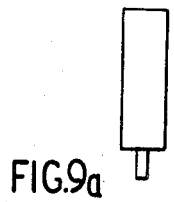
FIG. 9a
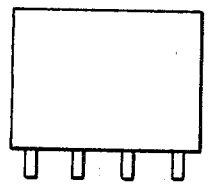
FIG. 9
INVENTOR
BERNARD AUTHUR COLE
ATTORNEYS

United States Patent Office 3,417,193
Patented Dec. 17, 1968

3,417,193
ELECTRICAL MODULE HAVING TERMINALS MADE FROM SEMICIRCULAR WIRE AND METHOD OF MAKING THE SAME
Bernard Arthur Cole, Bradwell, Great Yarmouth, Norfolk, England, assignor to Erie Resistor Limited, South Denes, Great Yarmouth, Norfolk, England, a British company
Filed Feb. 17, 1966, Ser. No. 528,315
Claims priority, application Great Britain, Aug. 23, 1965, 36,008/65
4 Claims. (Cl. 174—68.5)

ABSTRACT OF THE DISCLOSURE

This invention relates to a module for electric circuits comprising a substrate and wire terminals attached to the substrate, each of the wired terminals being formed by wire having a semicircular cross-sectional shape with the flat section of one portion of the wire engaging one face of the substrate and the flat section of another portion of the wire engaging the opposite face of the substrate, the wire portions projecting away from the substrate being secured together at their flat surfaces to form a circular in cross-section wire terminal. The substrate may be completely incapsulated with electrical insulating material.

---

This invention relates to the construction of electrical circuits and to module construction comprising a substrate having wire terminals attached thereto.

With known constructions of modules, leads consisting of circular section wires, flattened at one end are soldered or welded to a flat substrate in appropriate positions. The wire terminals may be formed prior to or after soldering in order that the axis of both substrate and terminal coincide.

With the known construction of modules, difficulties arise due to mechanical unbalance and terminal nonalignment which cause trouble during subsequent processing, i.e., moulding, potting or dipping for example.

An object of the present invention is to provide an improved module and method of making the same which avoids the difficulties referred to above.

According to one aspect of this invention there is provided a module for electric circuits comprising a flat substrate and wire terminals attached to the substrate, each wire terminal being formed by wire having a semicircular cross sectional shape with flat section of one portion of the wire engaging one face of the substrate and flat section of another portion of the wire engaging the opposite face of the substrate and the wire portions projecting away from the substrate are secured together at their flat surface to form a circular wire terminal.

According to another aspect of the invention there is provided a method of providing an electrical insulating covering for a substrate having wire terminals extending from one side thereof comprising inserting the wire terminals into holes formed in a removable base of a hollow moulding die, inserting the base with the substrate thereon into the die, filling the die with a suitable moulding medium, placing the die in a heated platen, forcing a plunger into the die to compress the moulding medium around the substrate and terminals, maintaining the pressure of the plunger for an appropriate time until the moulding medium is cured, releasing the plunger, removing the base of the die, and then removing the moulded substrate from the base of the die.

The invention will now be described by way of example with reference to the accompanying drawings wherein:

FIGURE 1 shows a top plan view of a known form of substrate and illustrates connections for wire terminals on the substrate, FIGURE 1a shows a side elevation of FIGURE 1, looking in the direction of the arrow, FIGURE 2 shows a top plan view of a substrate illustrating a further known construction, FIGURE 2a shows a side elevation of FIGURE 2, looking in the direction of the arrow, FIGURE 3 shows a plan view of a wire for use in forming terminals on a substrate in according with the present invention, FIGURE 3a shows an end view of the wire shown in FIGURE 3, looking in the direction of the arrow, FIGURE 3b shows a cross-sectional view of the one of the legs of the U-shaped wire shown in FIGURE 3, FIGURE 4 shows a side view of a jig used for applying wire, as shown in FIGURE 3, to a substrate, FIGURE 4a shows an end view of the jig shown in FIGURE 4, FIGURE 5 shows a side view of the jig shown in FIGURE 4, but illustrating the insertion of a substrate between the U-limbs of the wire, FIGURE 5a shows an end view of the jig shown in FIGURE 5, looking in the direction of the arrow, FIGURE 6 shows a plan view of the substrate having soldered thereto the U-shaped terminal and illustrates another stage in the production of a module constructed in accordance with the present invention, FIGURE 6a shows an end view of the substrate shown in FIGURE 6, looking in the direction of the arrow, FIGURE 7 shows a plan view of a substrate and illustrates a further stage in the production of a module in accordance with the present invention, FIGURE 7a shows an end view of FIGURE 7, looking in the direction of the arrow, FIGURE 8 shows a sectional side view of a die for moulding an electrical insulating medium around a substrate formed as shown in FIGURE 7, and also showing a plunger for insertion into the die to compress the moulding medium, FIGURE 8a shows a sectional side view of the mould shown in FIGURE 8, FIGURE 9 shows a plan view of the finished moulded module constructed in accordance with the present invention and, FIGURE 9a shows an outside end view of the module shown in FIGURE 9.

Referring to the drawings and particularly to FIGURES 1 and 2, the substrate 1 shown in FIGURE 1, shows a known form of the attaching circular section wires 2, to the flat substrate in order to provide terminals. The wires 2, are flattened at the ends to be attached to the substrate surface and are bent around the end of the substrate as shown in FIGURE 1a.

Another known construction of substrate is shown in FIGURES 2 and 2a, which show a specially moulded substrate 3, which is substantially thicker than that shown in FIGURE 1 and along one edge of the substrate there are provided round, square or triangular holes 4 for terminal insertion.

Also provided are cutaways 5, surrounding each terminal 6, which enable metallic connections to be made with circuitry upon the substrate face and also facilitate soldering terminals into position.

With the known forms of substrate shown in FIGURES 1 and 2, difficulties arise due to terminal misalignment which cause trouble during subsequent processing and a module constructed in accordance with the present invention avoids these difficulties and will now be described.

Referring to FIGURE 3, this shows a terminal wire 7 which is used in constructing a substrate in accordance with the invention, the wire 7 is of U-shaped form and has a cross-sectional shape as shown in FIGURES 3a and 3b. In attaching a substrate to the terminal wires 7, the wires 7 are assembled in a jig 8, as shown in FIGURE 4, with the open end of the U extending above the jig so that a substrate 9 can be inserted between the legs of the U as shown in FIGURES 5 and 5a, and with the flat sides of the wires engaging the flat surface of the substrate. Tension between the U-legs is sufficient to prevent the substrate from falling out of the jig when inverted.

After the flat sides of the wires are applied to the substrate surfaces they are soldered to the substrate leaving an open portion 10 as shown in FIGURE 6a. The soldering may be done by dipping, hot air, induction heating or wave techniques. Subsequently, after soldering and cleaning the substrate, the open portions 10 of the wires 7 are closed by placing the wires between the jaws of a forming tool so that the flat portions of each of the two limbs of a wire, which project from the substrate, are brought together so forming circular section wire terminals 11, as shown in FIGURES 7 and 7a, and which may be inserted in a printed circuit or other base.

The substrate shown in FIGURES 7 and 7a, after spraying with a protective coat, is now ready for the application of a covering of electrical insulating material and this may be applied by potting or moulding in a device such as that shown in FIGURES 8 and 8a.

Referring to FIGURE 8, a hollow die mould 12 of rectangular form is provided with a removable base 13 having holes corresponding in number to the substrate terminals, and 14 indicates a plunger for insertion in the mould.

When it is desired to cover the substrate with electrical insulating material, the substrate 9 is mounted on the die base 13 by means of the terminals 11 entering the holes in the said base, and after which the base 13, together with the substrate 9 thereon, is inserted in the hollow die 12, and the die 12 is then placed in a heated platen. The plunger 14, which is shaped to fit within the die 13 and mounted on a press, is brought down and compresses the now plasticised moulding medium and forces it around the terminals and the substrate.

After the appropriate curing time the plunger 14 is withdrawn from the die, the base 13 is removed from the die 12 and the substrate in the form of a module is removed from the base 13.

The substrate material used may be varied from a simple alumina, for say resistors, to dielectric materials of varying characteristics for capacitance requirements.

By the term "module" as used throughout the present specification is meant a packaged assembly comprising a unit having circuit parts and solderable terminals which unit may include active and/or passive components and plugs.

And by the term "substrate" is meant the physical material on which a circuit is fashioned or attached and which material may have applied thereto circuit parts in printed or other form.

I claim:

1. A module for electric circuits comprising a substrate with terminals formed from wire having a semicircular cross-sectional shape and with said substrate arranged between two portions of said wire with flat surfaces of the wire portions engaging the surfaces of said substrate and secured thereto and the portions of said wire projecting away from said substrate secured together at their flat faces to form wire terminals circular in cross-section.

2. A module for electric circuits as claimed in claim 1 wherein the said substrate is incapsulated in electrical insulating material and said circular cross-section wire terminals project out from said incapsulated substrate.

3. A method of applying a wire terminal to a substrate for a module for an electrical circuit comprising the steps of providing a wire having a semicircular cross-sectional shape, bending the wire into a U-form, with the flat faces of said wire facing each other, inserting said wire into a jig with the open end of the U extending above the jig, inserting said substrate between the legs of the U, soldering the flat faces of said wire to said substrate so as to form a secure connection, and compressing those portions of said wire projecting from said substrate so that the flat faces of said wire meet and form a wire terminal circular in cross-section.

4. A method of applying a wire terminal to a substrate as claimed in claim 3, further comprising the steps of inserting the circular in cross-section wire terminals in holes formed in a removable base of a hollow moulding die, inserting the base with the substrate thereon into said die, filling the die with a suitable electrically insulating moulding medium, placing the die in a heated platen, forcing a plunger into the die to compress the moulding medium around the substrate, maintaining the pressure of the plunger for an appropriate time until the moulding medium is cured, releasing the plunger, removing the base from the die, and then removing the moulded substrate from the base of the die.

References Cited

UNITED STATES PATENTS 3,084,391  4/1963  Parstorfer.

FOREIGN PATENTS 909,921  11/1963  Great Britain.

DARRELL L. CLAY, *Primary Examiner.*

U.S. Cl. X.R.

317—101; 29—627, 628; 339—17, 275; 264—272; 338—322